(12) United States Patent
Stöger (10) Patent No.: US 8,564,227 B2
(45) Date of Patent: Oct. 22, 2013

(54) METHOD AND DEVICE FOR ACTIVATING A CONTROL ELEMENT OF A DRIVE APPARATUS, SAID CONTROL ELEMENT HAVING A RESPONSE DELAY

(75) Inventor: Christian Stöger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 18 days.

(21) Appl. No.: 13/260,432

(22) PCT Filed: Mar. 23, 2010

(86) PCT No.: PCT/EP2010/053785
§ 371 (c)(1),
(2), (4) Date: Sep. 26, 2011

(87) PCT Pub. No.: WO2010/108923
PCT Pub. Date: Sep. 30, 2010

(65) Prior Publication Data
US 2012/0032618 A1     Feb. 9, 2012

(30) Foreign Application Priority Data
Mar. 25, 2009   (DE) .......................... 10 2009 014 808

(51) Int. Cl.
*G08B 13/08*     (2006.01)
*H02P 1/00*      (2006.01)

(52) U.S. Cl.
USPC ........... 318/127; 318/257; 318/266; 318/434; 318/469; 49/26; 49/28

(58) Field of Classification Search
USPC ................. 318/266, 466, 257, 434, 469, 127; 49/26, 28; 340/545.1
See application file for complete search history.

(56) References Cited

U.S. PATENT DOCUMENTS 5,592,777 A    1/1997   Petri et al. .......................... 49/28
5,966,071 A *  10/1999  Tsuge et al. ................... 340/438
(Continued)

FOREIGN PATENT DOCUMENTS

CN    1321214 A    11/2001
CN    1573623 A     2/2005
(Continued)

OTHER PUBLICATIONS

International PCT Search Report and Written Opinion, PCT/EP2010/053785, 15 pages, Oct. 19, 2010.
Chinese Office Action, Application No. 201080013327.2, 18 pages, Oct. 19, 2012.

*Primary Examiner* — Eduardo Colon Santana
*Assistant Examiner* — Bickey Dhakal
(74) *Attorney, Agent, or Firm* — King & Spalding L.L.P.

(57) ABSTRACT

In order to activate a control element (4) of a drive apparatus (1) for driving an object that can be moved between two end positions, the control element having a response delay ($\Delta t_{anspr}$) a parameter ($F_{akt}$) influenced by the drive apparatus (1) is monitored and compared with a specified threshold ($F_{Th}$), upon the achievement of which a control signal is output to the control element (4); a pre-threshold ($F_v$) to be achieved before the achievement of the threshold ($F_{Th}$) is defined, upon the achievement of which pre-threshold a pre-control signal is output to the control element (4) for the preparatory activation thereof, and afterwards further monitoring for the achievement of the actual threshold ($F_{Th}$) is performed, wherein upon achievement of the actual threshold ($F_{Th}$), the control element activation is retained, whereas if the actual threshold ($F_{Th}$) is not achieved, the control element activation is rescinded.

20 Claims, 6 Drawing Sheets

(56) References Cited

U.S. PATENT DOCUMENTS

| | | | |
|---|---|---|---|
| 6,359,408 B1 | 3/2002 | Tyckowski | 318/469 |
| 6,366,042 B1 * | 4/2002 | Gerbetz | 318/286 |
| 6,456,027 B1 | 9/2002 | Pruessel | 318/445 |
| 6,504,332 B1 | 1/2003 | Lamm | 318/445 |
| 7,295,894 B2 | 11/2007 | Anderson et al. | 700/275 |
| 2002/0117982 A1 | 8/2002 | Jehn | 318/280 |
| 2005/0156547 A1 * | 7/2005 | Gregori | 318/282 |
| 2006/0113936 A1 * | 6/2006 | Goth | 318/280 |

FOREIGN PATENT DOCUMENTS

| | | |
|---|---|---|
| DE | 4434334 C1 | 8/1995 |
| DE | 19908658 A1 | 8/2000 |
| DE | 19941475 A1 | 3/2001 |
| DE | 10108975 A1 | 9/2002 |

* cited by examiner

METHOD AND DEVICE FOR ACTIVATING A CONTROL ELEMENT OF A DRIVE APPARATUS, SAID CONTROL ELEMENT HAVING A RESPONSE DELAY

CROSS-REFERENCE TO RELATED APPLICATIONS

This application is a U.S. National Stage Application of International Application No. PCT/EP2010/053785 filed Mar. 23, 2010, which designates the United States of America, and claims priority to German Application No. 10 2009 014 808.6 filed Mar. 25, 2009, the contents of which are hereby incorporated by reference in their entirety.

TECHNICAL FIELD

The invention relates to a method and a device for actuating a control element, having a response delay, of a drive apparatus for driving an object which can be moved between two end positions, wherein a parameter which is influenced by the drive apparatus is monitored and compared with a predefined threshold value, and when said threshold value is reached a control signal is output to the control element.

BACKGROUND

In means for actuating drive apparatuses it is repeatedly the case that a delayed reaction to an actuation process has to be accepted owing to a response delay which is caused by a control element for the drive apparatus. Apart from, for example, compressed-air-actuated drive apparatuses with pneumatic control valves, which can introduce such a response delay, this also applies to inductive actuators, generally actuators with switching delays. A quite specific example are drive apparatuses with an electric motor for moving components in motor vehicles (Kfz), with automatic operation, such as for example window lifters, sunroofs, and also tailgates, sliding doors and similar components. In the means for actuating the electromagnetic drive apparatuses which are provided here, switching relays are generally used and this applies, generally to many controllers for electric motors. Specifically when a reversal of direction is provided for the motor, relays are used for energizing the motors, also for reasons of cost.

In the motor vehicle components mentioned above, such as for example window lifters with automatic operation, an anti-trapping means is frequently provided, which requires the rapid reversal of the rotational direction, or the rapid reversal of the polarity of the electric motor which this requires, when a trapping situation is detected. Such an anti-trapping means is usually implemented using computer means, for example a correspondingly programmed microprocessor or microcomputer, which then actuate a relay as a control element. Switching relays are known to require a certain time to allow an actuation (stimulation) to follow a reaction (switching). These delay times can then easily be accepted, or it is attempted to make an early detection or early decision by means of the software, if an event can be evaluated as "trapping". For example, the force threshold value with which the current closing force is compared could be defined as being basically lower than is actually justified, in order therefore to be able to make a correspondingly early decision about a trapping situation. However, in such a case it may subsequently be found that the force drops again before the actual threshold value is reached and in fact a trapping situation has not occurred, and that the reaction with reversing the motor is therefore incorrect. As a result, uncertainties and low levels of robustness in the systems affected arise when the intention is to compensate the above-mentioned delay times in this way.

SUMMARY

According to various embodiments this can be remedied and a method and a device such as those specified at the beginning can be provided with which delayed reactions to actuation processes can be avoided even in the case of control elements with a response delay, wherein, for example in the case of vehicle components with anti-trapping means, the control element—here a switching relay—is actuated with reversed polarity even when there is only a suspicion of trapping.

According to an embodiment, in a method for actuating a control element, having a response delay, of a drive apparatus for driving an object which can be moved between two end positions, a parameter which is influenced by the drive apparatus is monitored and compared with a predefined threshold value, and when said threshold value is reached a control signal is output to the control element, wherein a pre-threshold value which is to be reached before the threshold value is reached is defined, and when said pre-threshold value is reached a pre-control signal is output to the control element for the preparatory actuation thereof, and wherein afterwards further monitoring is performed to determine whether the actual threshold value has been reached, wherein, when the actual threshold value is reached, the actuation of the control element is maintained, whereas if the actual threshold value is not reached, the actuation of the control element is canceled again.

According to a further embodiment, after the pre-threshold value has been reached, monitoring can be performed to determine whether the actual threshold value has been reached for a predefined time, for example 1 ms to 2.5 ms. According to a further embodiment, the predefined time may correspond to a clock time predefined for the monitoring, or a multiple thereof. According to a further embodiment, the pre-threshold value can be defined as a value which is referred to the actual threshold value. According to a further embodiment, the pre-threshold value can be defined as being below the actual threshold value to a greater or lesser extent depending on the instantaneous change in the monitored parameter. According to a further embodiment, a switching relay, which is arranged in the circuit of an electric motor, can be actuated as a control element. According to a further embodiment, the relay actuation means can be part of an anti-trapping system, wherein the monitored parameter is a variable which is referred to a closing force. According to a further embodiment, a control signal with a level which can be reduced compared to a previously applied signal level is fed to the control element starting from the time when the pre-threshold value is reached, wherein the control signal is switched off when the actual threshold value is reached, and in contrast the previous signal level is applied again when the actual threshold value is not reached.

According to another embodiment, a device for actuating a control element, having a response delay, of a drive apparatus for driving an object which can be moved between two end positions, may comprise comparison means for monitoring and comparing a parameter which is influenced by the drive apparatus with a predefined threshold value, and when said threshold value is reached a control signal is output to the control element, and means for defining a pre-threshold value which is to be reached before the threshold value is reached, and characterized in that the comparison means are configured also to compare the monitored parameter with the pre-threshold value, and when said pre-threshold value is reached, a pre-control signal is output to the control element for the preparatory actuation thereof, and in that afterwards further monitoring is performed to determine whether the actual threshold value has been reached, wherein, when the actual threshold value is reached, the actuation of the control element is maintained, whereas if the actual threshold value is not reached, the actuation of the control element is canceled again.

According to a further embodiment of the device, after the pre-threshold value has been reached, monitoring can be performed to determine whether the actual threshold value has been reached for a predefined time, for example 1 ms to 2.5 ms. According to a further embodiment of the device, the predefined time may correspond to a clock time predefined for the cyclically executed monitoring, or a multiple thereof. According to a further embodiment of the device, the pre-threshold value can be defined as a value which is referred to the actual threshold value. According to a further embodiment of the device, the pre-threshold value can be defined as being below the actual threshold value to a greater or lesser extent depending on the instantaneous change in the monitored parameter. According to a further embodiment of the device, a switching relay, which is arranged in the circuit of an electric motor, can be provided as a control element. According to a further embodiment of the device, the relay actuation means can be part of an anti-trapping system, wherein the monitored parameter is a variable which is referred to a closing force. According to a further embodiment of the device, a control signal with a level which can be reduced compared to a previously applied signal level is fed to the control element starting from the time when the pre-threshold value is reached, wherein the control signal is switched off when the actual threshold value is reached, and in contrast the previous signal level is applied again when the actual threshold value is not reached.

BRIEF DESCRIPTION OF THE DRAWINGS

The invention will be explained further below on the basis of exemplary embodiments, to which it is, however, not to be restricted, and with reference to the drawings, in which.

DETAILED DESCRIPTION

The various embodiments are based here on the realization that the control elements with response delays, that is to say in particular switching relays or their coils, require a certain time before they respond, for example until a current is built up or reduced, and this time can be used to prepare the ultimate decision about the actuation, for example whether or not an event is to be evaluated as trapping. In control elements with response delays it is therefore possible already to actuate the control element in a preliminary fashion at an early time, wherein the actuation is then either maintained ultimately to the decision time or else canceled. If the decision or actuation is canceled, this decision must be made at a time at which the reaction by the control element has not yet been triggered, that is to say during the inherent delay times; if the actuation means is then activated, a gain in time corresponding to almost the entire delay time in question is therefore achieved; this may constitute, for example, several milliseconds (ms).

Accordingly, various embodiments provide for example a method such as that specified at the beginning which is wherein a pre-threshold value which is to be reached before the threshold value is reached is defined, and when said pre-threshold value is reached a pre-control signal is output to the control element for the preparatory actuation thereof, and in that afterwards further monitoring is performed to determine whether the actual threshold value has been reached, wherein, when the actual threshold value is reached, the actuation of the control element is maintained, whereas if the actual threshold value is not reached, the actuation of the control element is canceled again.

In the present method, the control element, for example a switching relay, is therefore already actuated in a preliminary fashion at an early time, even before the decision regarding actuation; depending on whether the actual threshold value is reached or not, it is then ultimately decided, even during the time period which is given by the response delay and in which the control element has not yet reacted to the actuation process and the drive apparatus therefore continues to be operated in the given method of operation, whether the actuation is either to be confirmed or else canceled. In the case of confirmation of a preliminary actuation process, in the simplest case the actuation which has taken place remains in the form in which it was initiated, with the result that the control of the drive apparatus is then correspondingly switched over within a very short time after the ultimate decision, specifically measured from the time at which the pre-threshold value is reached, starting from the time of the preliminary actuation; if, on the other hand, the actuation of the control element is canceled, since the actual threshold value is in fact not reached, the control element will not ultimately react to the early preliminary actuation on the basis of its response delay, and no reaction occurs in the sense of switching over etc. of the drive apparatus. This results in a gain in time in terms of the switching over of the drive apparatus from approximately the time of response delay of the control element. In the case of automatically driven motor vehicle components with anti-trapping means, this can constitute a gain in time of 1, 2 or 3 ms, depending on the cycle time of the software. This is certainly significant if it is considered that a window pane of a motor vehicle moves, for example, at approximately 100 mm/s, with the result that the early detection of a trapping situation provides an advantage of 0.1 mm. This signifies a gain in robustness of 6.5N or 6.5% in terms of a measuring spring rate, compared to the maximum legally prescribed limiting value of 100N. However, if the gain is related to the triggering threshold of 30N or 40N, as would be more practical and appropriate, the increase in the triggering threshold which is possible as a result of this gives rise to an increase in the robustness of the system of more than 15%.

The achievable time advantage is, moreover, favorable in particular when the driven component, for example a window pane of a motor vehicle, is moving quickly. Such rapid driving means that the voltage at the drive motor and accordingly also the voltage supply at the relay of the control element are high. However, precisely in such a situation with a high supply voltage the coil current in the relay is high even in the case of a switching relay, which in turn means that the current takes longer to decay when the relay is to be switched over. The available "biasing time" is therefore longer in this example than specified above and the gain in robustness is even greater. As already explained in the introduction, the present principle can also be applied to other drive apparatuses or the control elements thereof, in particular inductive actuators or actuators with a switching delay, if rapid reaction times are necessary despite a response delay, in particular in order to increase the robustness of the system.

The time between the point when the pre-threshold value is reached and the ultimate decision could be defined as a function of various parameters such as, for example, of the rate of change of the parameter which is influenced by the drive apparatus (that is to say for example the closing force). However, investigations have shown that to simplify the system it is sufficient if, after the pre-threshold value has been reached, monitoring is performed to determine whether the actual threshold value has been reached for a predefined, fixed time, for example 1 ms to 2.5 ms. In this case, the predefined time is therefore a permanently set time interval, which is, of course, shorter than the time of the response delay. In the case of cyclical monitoring or repetition of calculations, in particular by a correspondingly programmed microprocessor or microcomputer, the present time is expediently tailored to the clock time or repetition time of these monitoring processes and calculation processes, that is to say the algorithm. A precondition for this is that, of course, this clock time or cycle time is shorter than the time of the response delay.

The pre-threshold value is preferably simply defined as a value which is referred to the actual threshold value. In this context it is per se conceivable to define the pre-threshold value as being below the actual threshold value to a greater or lesser extent depending on the instantaneous change in the monitored parameter and/or on the rate of change of the actual threshold value, with the result that in the case of relatively pronounced increases a greater difference occurs between the actual threshold value and the pre-threshold value, and vice versa a smaller difference is provided when there are slight changes. However, in many cases the pre-threshold value can simply be predefined as lower than the actual threshold value by a fixed difference.

As already stated, the present method is particularly advantageously suitable for application in anti-trapping systems in automatically driven motor vehicle components, wherein a switching relay, which is arranged in the circuit of an electric motor, is actuated as a control element. The relay actuation means is then, in particular, part of an anti-trapping system, and the monitored parameter is a variable which is referred to the trapping force.

It is also particularly advantageous if a control signal with a level which is reduced compared to a previously applied signal level is fed to the control element starting from the time when the pre-threshold value is reached, wherein the control signal is switched off when the actual threshold value is reached, and in contrast the previous signal level is applied again when the actual threshold value is not reached. In this embodiment, a multi-stage current is therefore provided for the relay coil, wherein, apart from the customary holding current, after the pre-threshold value has been reached, that is to say in the "pre-warning stage", a smaller current is fed to the relay coil, but in this state the relay does not yet drop out in the predefined time interval. When the actual threshold value is then reached, the relay current is reduced further or switched off and the relay then drops out quickly. Supplying current in such a multi-stage fashion for the relay coil can be performed easily by, for example, two driver circuits (for example with transistors) with various series resistors.

Figure 1:
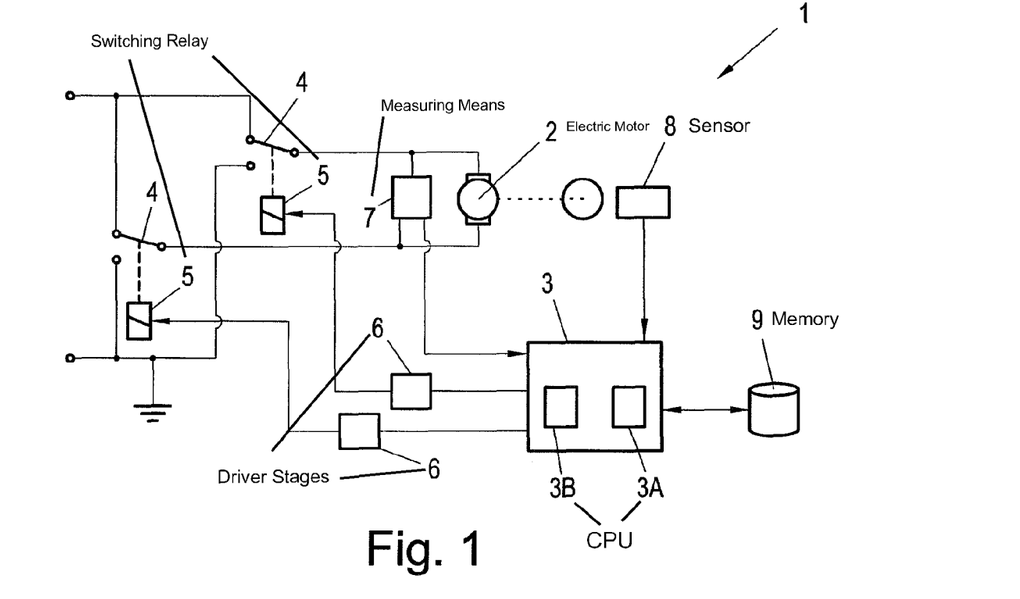
FIG. 1 shows a block circuit diagram of a mechanical adjustment system, for example for a motor vehicle window or a sunroof, with anti-trapping means, wherein the technology according to various embodiments can be applied.
Figure 6:
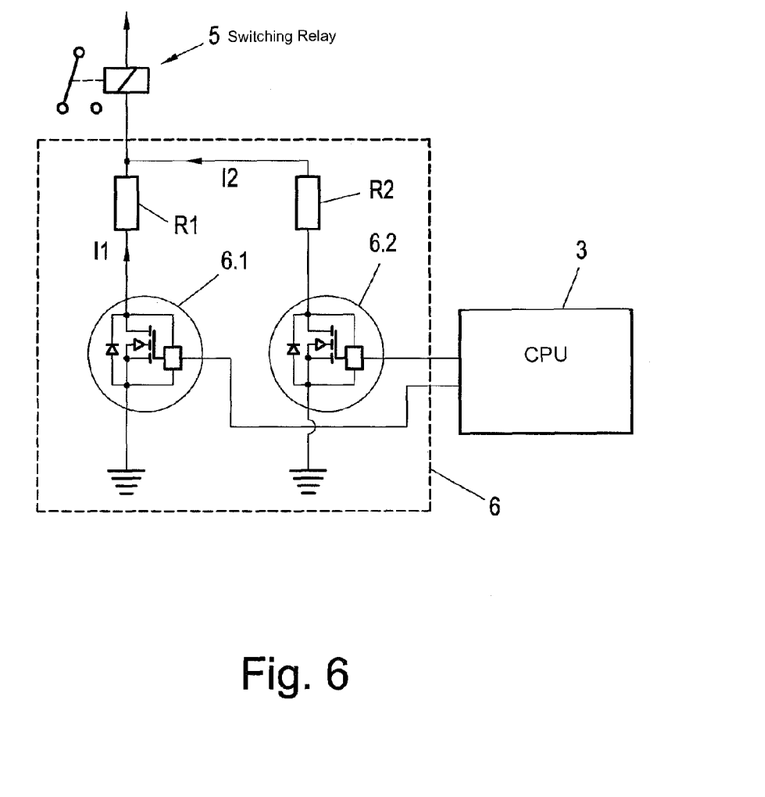
FIG. 6 shows a circuit diagram of a detail of a modified actuation means for a relay as a control element, with a stepped coil current.

FIG. 1 is a schematic view of a block circuit diagram of a drive apparatus, i.e. adjustment apparatus, 1 with an electric motor 2 for driving a motor vehicle component (otherwise not illustrated further), such as a side window or a sunroof, wherein central computer means 3 (CPU 3) are provided as an essential component of the apparatus 1 in order, for example, to actuate the motor 2 in terms of its rotational direction by means of control elements 4 in the form of switching relays 5. The switching relays 5 are actuated here by means of driver stages 6, embodiments of which, which will be explained in more detail below, are shown by way of example in FIGS. 4 and 6.

The voltage which is actually applied to the motor 2 is optionally measured using measuring means 7, wherein the corresponding measured values are fed to the computer means 3. In the example shown, a sensor 8 for measuring the rotational movement, specifically with respect to the detection of position, speed and/or angular speed and/or force of the motor 2, is also provided; this sensor 8 can be provided for forming a control system, additionally or instead of the measuring means 7, and it can, for example, be a Hall sensor. The output signal (measuring signal) of the sensor 8 is also fed to the computer means 3. The computer means 3 is also connected to a memory 9 in which data relating to the mechanical characteristic curve of the adjustment apparatus 1 or of the mechanical system of this adjustment apparatus 1 are stored. A possible characteristic curve $F_{Ref}$ is illustrated by way of example with the curve 10 in FIG. 2, wherein it is apparent that the force $F_{Ref}$ changes as a function of the time t and/or of the position s of, for example, a sunroof or a window lifter. This force $F_{Ref}$ which changes with the adjustment travel (the position s) is therefore known to the apparatus 1.

The computer means 3 form, in a way which is conventional per se, actuation means for the switching relays 5 and therefore for the motor 2, wherein an anti-trapping system is implemented—which also includes the switching relays 5—in order, as is known per se, to be able to reverse the motor 2 after the speed of the motor has been reduced in the event of trapping being detected.

The switching relays 5 are shown only in an entirely schematic form in their (upper) position of rest in FIG. 1. During operation, one of the relays 5 is connected to ground in order to cause a current flow through the motor 2, and for the purpose of reversing the motor 2, the two relays 5 change the switching position in order to reverse the direction of the current flow.

As is known per se, physical conditions define the relationship between the voltage $U_{Mot}$ at the motor, the force F at the motor and the angular speed ω of the motor, in which case it is possible to derive that:

$$F = k_1 U_{Mot} + k_2 \omega$$

wherein in this equation only known system constants k1, k2 occur together with the aforementioned variables.

This closing force F, referred to as $F_{akt}$, which is calculated according to the relationship above is used as the basis of the detection of the trapping force according to the prior art. The closing force $F_{akt}$ changes here if an object, such as for example an arm, a hand or else a head, is trapped by the driven component, for example a motor vehicle side window or a sunroof. Such a trapping situation is illustrated schematically in region 11 in the diagram in FIG. 2, where it is apparent that the closing force $F_{akt}$ rises excessively, specifically owing to the trapping of an object, starting at a time t0, and in the process deviates upward from the reference force $F_{Ref}$ curve 10, predefined by the mechanism. Parallel to this curve 10, a curve is defined which predefines a threshold value $F_{Th}$, and when said threshold value $F_{Th}$ is reached at the time t2—see point 12—a trapping situation is detected. This monitoring and this comparison of the closing force $F_{akt}$ with the threshold value $F_{Th}$ takes place in the computer means 3 or in comparison means 3B provided therein, see FIG. 1. This technique, insofar as it has been described hitherto, corresponds to the prior art, and it is apparent that when the threshold value $F_{Th}$ is reached in FIG. 2, that is to say at the point 12, actuation of the switching relay 5 first takes place, with the result that owing to the given response delay of the switching relays 5 the reversing of the motor is not initiated until after a further delay time.

Figure 2:
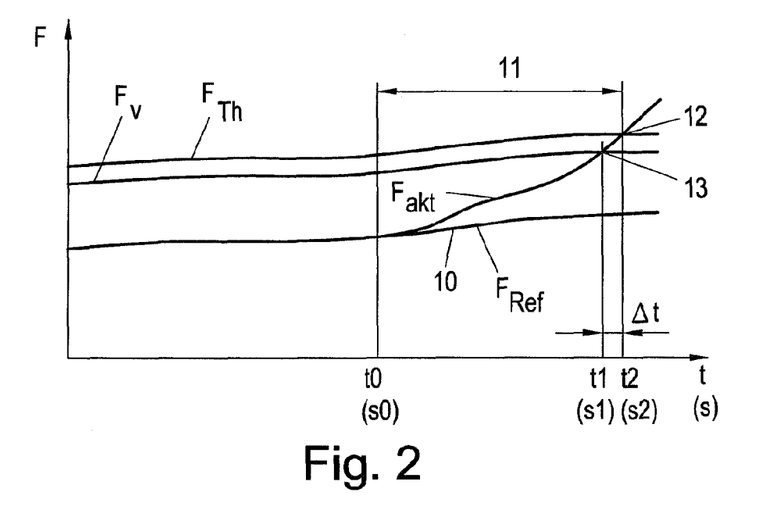
FIG. 2 shows a diagram of the time profile of forces or threshold values in the field of a trapping situation in order to clarify the principle of the invention.

In order now to permit a quicker reaction, in particular in terms of reversing of the motor 2, a pre-actuation process of the switching relays 5 is already brought about at a relatively low pre-threshold value $F_v$, see FIG. 2, specifically at a time t1 when the force $F_{akt}$—at the point 13—reaches this pre-threshold value $F_v$. This pre-threshold value $F_v$ is predefined, for example, using the computer means 3, cf. the predefining means 3A in FIG. 1. For the sake of completeness it will be mentioned here that, apart from the time t, the position s of the driven component can also be plotted on the x axis in FIG. 2, with the result that, instead of the times t0, t1, t2, position values s0, s1, s2 can also be set, as has occurred in FIG. 2 with expressions between parentheses.

As result of this preliminary or pre-actuation of the switching relays 5, or generally of the control elements 4, by the computer means 3 at an earlier time t1 (or earlier position value s1) than the time t2 or position point s2 where the actual trapping detection takes place, a gain in time approximately equal to the time of the response delay of the control element 4 or of the switching relays 5 can be achieved. However, it is significant here that the pre-threshold value $F_v$ is defined in such a way that the time interval of the response delay is to be utilized as well as possible without the interval Δt=(t2−t1) becoming longer than the time interval of the response delay.

If, according to FIG. 2, the closing force $F_{akt}$ then reaches the pre-threshold value $F_v$ at the point t1 or s1 (see point 13 in FIG. 2), the pre-actuation of the switching relays 5 occurs, as mentioned in the sense of switching over or reversing of the motor 2 in the given example. Nevertheless, the system continues to operate up to this point t1 or s1, since the switching relays 5 or general control elements 4 do not respond immediately but rather only after a time delay, which can be, for example, 2, 3 or 4 ms depending on the design. If the actual threshold value $F_{Th}$ is then reached within this delay interval—at the point 12, at the time t2 or at the position s2—the pre-actuation process which has occurred remains, i.e. the actuation of the control elements 4 or of the switching relays 5 is "activated", and accordingly in the examples shown the reversing of the motor 2 occurs shortly afterwards, wherein the interval of the response delay can now be calculated starting from the time t1, instead of from the time t2. As a result the reversing of the motor 2 can be ensured within a significantly shorter time than hitherto, starting from the actually defined trapping situation at the time t2.

If, on the other hand, the closing force $F_{akt}$ does not reach the actual force threshold value curve $F_{Th}$ but, for example, drops away again after the point 13 (which is not shown in FIG. 2), this is detected given corresponding testing at a predefined time, for example for the sake of simplicity at the time t2 in FIG. 2 (but if appropriate also a time which is different therefrom, for example 2 ms after the time t1), and pre-actuation of the control elements 4 or of the switching relays 5 which is performed at the time t1 is canceled again. At this time of the canceling of the pre-actuation, within the time interval of the response delay, the motor 2 has not yet been reversed and, if therefore the pre-actuation is canceled early enough, the reversing of the motor 2 does not actually occur either, with the result that the closing movement is continued.

The predefined time interval Δt=t2−t1, which, as mentioned, is somewhat shorter than the time of the response delay, can, in the case of the embodiment with computer means 3 in the form of a microprocessor or microcomputer, be set in such a way that it corresponds to a computing cycle interval, i.e. a clock time of the computer means 3, or else to a multiple thereof. If, for example, the computer means 3 carry out the computation processes, in particular for the calculation of the current closing force $F_{akt}$, at intervals of 2 ms, and the time for the response delay is assumed to be 2.5 ms, precisely the clock time T=2 ms can then be selected for the time interval Δt. If the clock time is, for example, only 1 ms, i.e. the computer means 3 carry out the respective calculation processes at time intervals of T=1 ms, then Δt=2 T can be selected. Furthermore, a different definition of Δt is, of course, also possible, in particular if an analogous solution, with conventional comparators, is selected for the comparison of the current force $F_{akt}$ with the pre-threshold value $F_v$ and the actual threshold value $F_{Th}$, as will be explained in more detail below with reference to FIG. 9. For the sake of better understanding, the procedure with the possible pre-actuation, such as is described above with reference to FIGS. 1 and 2, will now be explained in more detail with reference to the flowchart in FIG. 3.

Figure 3:
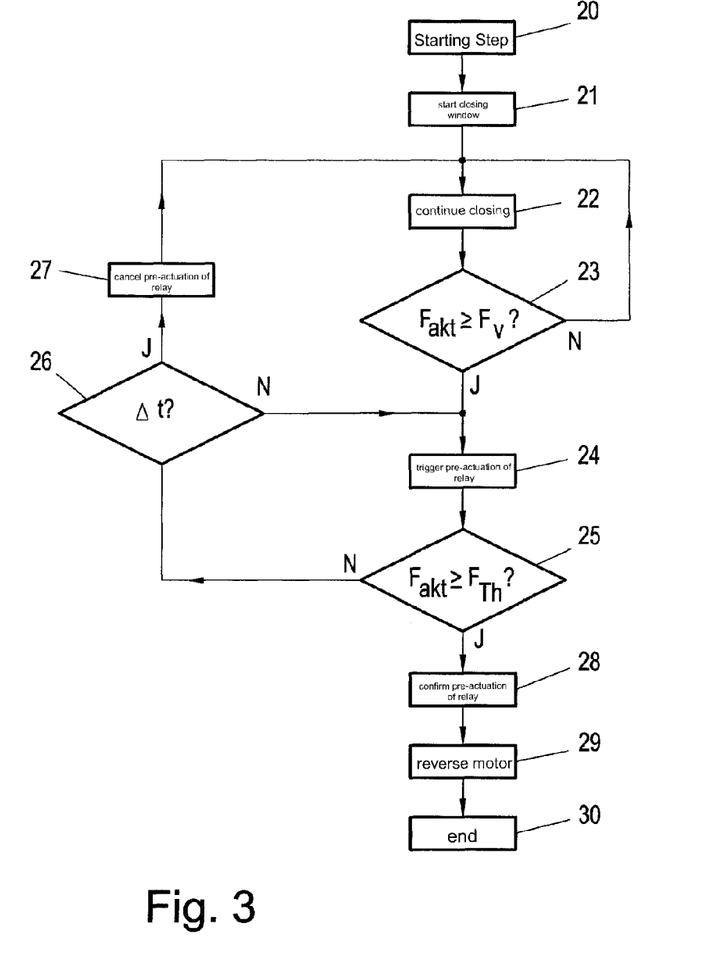
FIG. 3 shows a flowchart illustrating the procedure according to the method according to various embodiments.

For example, after a starting step 20 according to block 21 the closing of a window or sunroof is started, and with block 22 the maintaining of this actuation of the control elements 4 or of the switching relays 5 is specified. It is now interrogated, for example cyclically (in the case of the abovementioned cyclical calculation using the computer means 3) according to field 23 whether the current closing force $F_{akt}$ reaches the pre-threshold value $F_v$; as long as this is not the case the system returns to the block 22. However, if the closing force $F_{akt}$ reaches the pre-threshold value $F_v$, according to block 24 the pre-actuation of the switching relays 5 is triggered.

Subsequent to this, according to field 25 it is interrogated whether the current closing force $F_{akt}$ has reached the actual threshold value $F_{Th}$; if it has not it is, if appropriate, interrogated according to field 26 whether the predefined time interval Δt has expired, and if it has not the system returns to the block 24 and the pre-actuation is maintained. However, if the interval Δt has expired, wherein the closing force has not reached the actual threshold value $F_{Th}$, according to block the pre-actuation is canceled starting from the field 26 and the system returns to the block 22, according to which the switching relays 5 continue to be held.

However, if according to field 25 the current closing force $F_{akt}$ reaches the actual threshold value $F_{Th}$, according to block 28 the pre-actuation is confirmed, i.e. the switching relays 5 are then ultimately switched over, after passing through a short time interval when the already reduced coil current has dropped sufficiently, with the result that according to block 29 the motor 2 is then reversed in the sense of opening the sliding window or sunroof. Finally, the end of the sequence is reached at 30.

Figure 4:
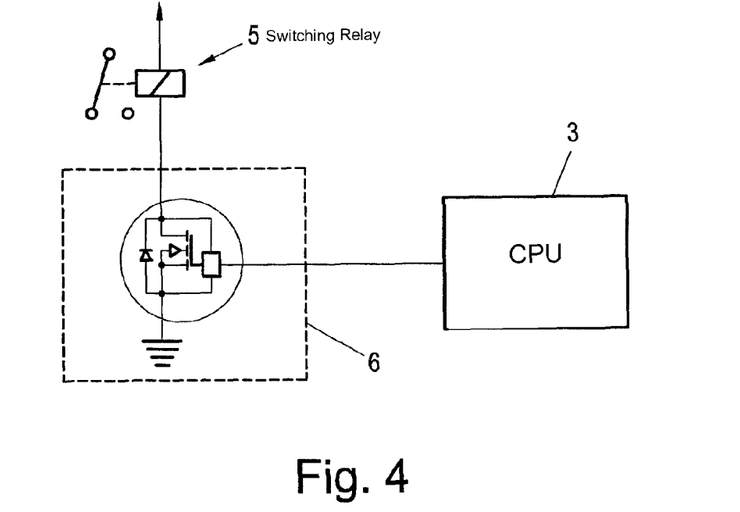
FIG. 4 shows a circuit diagram of a detail in FIG. 1, illustrating an actuation process of a relay which is provided as a control element.

FIG. 4 illustrates by way of example an embodiment of a driver stage 6 in the form of an intelligent driver on the basis of a field effect transistor (FET) with diode connected in parallel, wherein such an FET driver is commercially available. The computer means 3 actuate the respective switching relay 5 via this driver stage 6, i.e. according to FIG. 1 such a driver stage 6 is provided for each of the switching relays 5, as is shown in FIG. 1.

Figure 5:
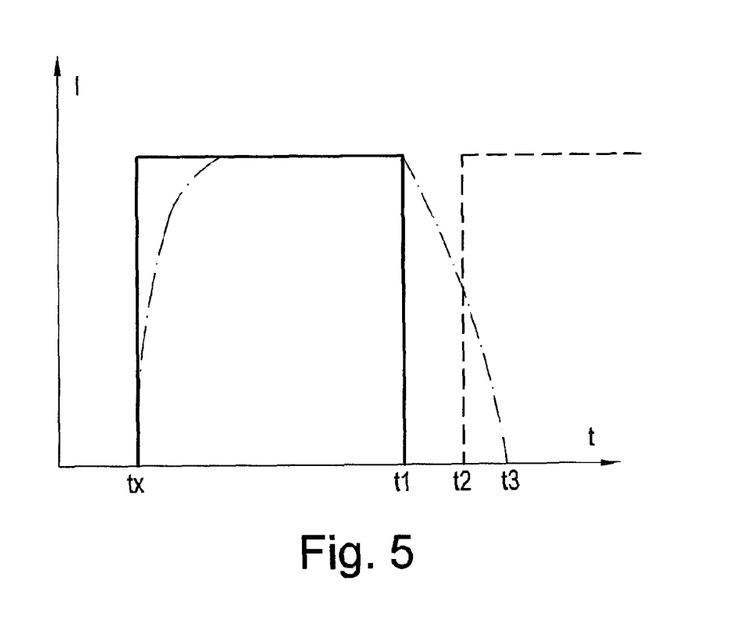
FIG. 5 shows a current/time diagram, associated with FIG. 4, for the purpose of illustrating the pre-actuation process of one of the relays.

FIG. 5 illustrates a schematic current diagram, wherein at a time tx it is assumed that a closing movement is started. It is to be noted that in FIG. 5 an idealized square-wave current profile is shown with an unbroken line, but that the actual coil current I through the relay coil deviates somewhat from the ideal square-wave form, as is illustrated by a dot-dashed line in FIG. 5.

At the time t1—cf. also FIG. 2—it is assumed that the current closing force $F_{akt}$ reaches the pre-threshold value $F_v$, and accordingly the computer means 3 correspondingly actuate each of the switching relays 5 via the respective driver stage 6, in order to perform switching over, wherein specifically the current I is switched off. As is illustrated here in turn with a dot-dashed line, the coil current I actually does not drop abruptly to 0 but rather has a gradual profile, corresponding to its inductance, towards 0, when the current which is provided for closing ends at the time t1. If the closing force $F_{akt}$ then reaches the actual threshold value $F_{Th}$ in the interval up to the time t2 (see FIG. 2, point 12), this changed actuation of the respective switching relay 5 (elimination of the current) is confirmed or continued, with the result that the current through the relay coil drops away further and as a result the switching relay is switched over, after a comparatively short time (t3−t2), for example at the time t3. As is apparent, the actual switching over time t3−t2 is significantly shorter, by virtue of the pre-actuation occurring, than the entire switching over time (t3−t1) would be without the pre-actuation.

Figure 7A:
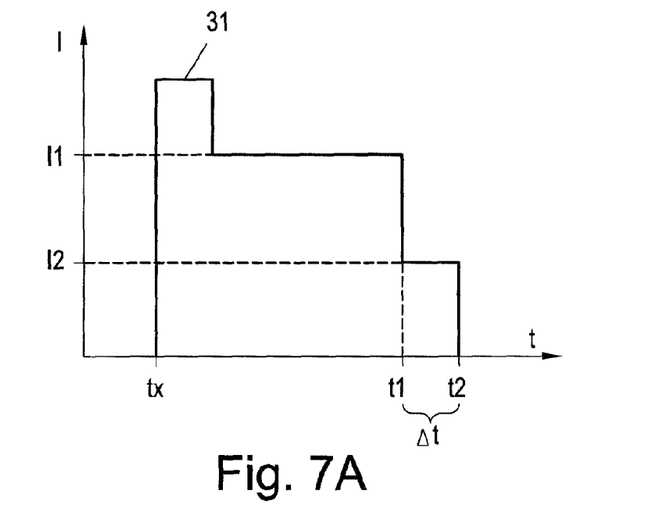
FIG. 7A shows an associated schematic energization diagram (without a real coil current) for the case in which switching over is to ultimately take place.

However, if the closing force $F_{akt}$ does not reach the actual threshold value $F_{Th}$ within the predefined time interval Δt, the preliminary actuation of the switching relay 5 is canceled again (by switching off the relay current), i.e. a holding current I is applied again, as is indicated by dashed lines in FIG. 5. In this case, the respective switching relay 5 has not yet been switched over (see the later time t3 in FIG. 5), with the result that the switching relay 5 is still in the holding state when the new holding current is applied to the relay coil. As a result, the switched position of the switching relay 5 which has been set remains and the closing movement which has been started (time tx) is continued without incorrect reversing occurring. If the switching off of the coil current by the respective switching relay 5 at the time t1 (with respect to the delayed response of the switching relay) within the time Δt which is predefined were to be critical, for example because the voltage at the switching relay 5 is low or the time interval Δt is almost equal to the time interval for the response delay, with the result that a response, i.e. switching over of the switching relay 5 would still be possible within the time interval Δt, the current or generally the actuation of the control element 4 can be switched off in two stages, as is apparent from FIGS. 6 and 7A, 7B. In turn, in this embodiment the relay current is switched on at the time tx in order to start the closing movement. In this respect, FIGS. 7A and 7B also illustrate schematically a starting current pulse at 31, while the holding current is denoted by I1. This holding current I1 is, as is shown in FIG. 4, provided by one of two FET drivers, for example the driver 6.2 which is on the left in FIG. 6 and which is assigned a low series resistor R1, compared with the series resistor R2 of a second FET driver 6.2, with the result that the latter supplies a relatively small current I2 when it is actuated by the computer means 3 at the time t1, see FIGS. 7A and 7B. The switch-on current pulse 31 can be obtained, for example, by both drivers 6.1 and 6.2 being actuated simultaneously by the computer means 3 in order therefore to ensure the fastest possible response of the respective response relay 5. Afterwards, the one driver 6.1 is actuated so as to supply the relay coil with the relatively high current I1, a holding current, while in this "continuous operating mode" the second driver 6.2 is switched off by the computer means 3. At the time t1, when the closing force $F_{akt}$ reaches the pre-threshold value $F_v$, the actuation of the two drivers 6.1, 6.2 is changed, with the result that a relatively low current I2 is now made available for the switching relays 5. This relatively low current I2 would not be sufficient to hold the respective switching relay 5 and it begins to drop away, but this is associated with a certain delay, an overall longer delay compared to FIG. 5.

At the time t2 after the time interval Δt, it is assumed that the closing force $F_{akt}$ reaches the actual threshold value $F_{Th}$ and the driver 6.2 is then also switched off, i.e. the current through the relay is completely switched off; the switching relay 5 therefore ultimately drops out, specifically in turn after a comparatively short time after t2, which is in any case shorter than without the pre-actuation between the times t1 and t2, similarly to what has already been explained above with respect to FIG. 5.

Figure 7B:
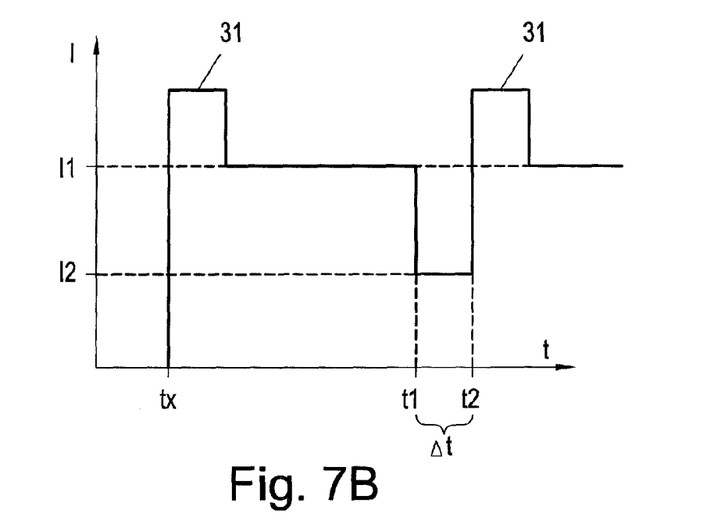
FIG. 7B shows a corresponding schematic energization diagram, but now for the case in which the pre-actuation process is canceled again.

On the other hand, if the actual threshold value $F_{Th}$ is not reached, at the time t2 the current supply to the relay coil is started again, as is apparent from FIG. 7B, with the result that the respective switching relay 5 remains in the previously assumed switching position.

Figure 8:
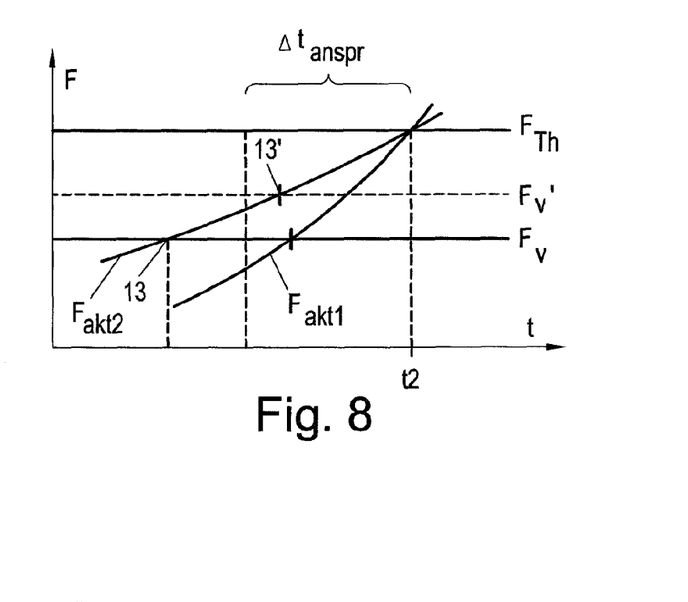
FIG. 8 shows a diagram of various force profiles assigned to an ultimate threshold value, which is constant here by way of example, and to various pre-threshold values which are specified as a function of the gradient of the closing force.

FIG. 8 shows how it is also possible, using the computer means 3 according to FIG. 1, to allow for the fact that the closing force $F_{akt}$ increases at differing rates, wherein, in particular, an instantaneously slow increase can be problematical when, as a result of the short increase after the pre-threshold value $F_v$ has been reached, the actual threshold value $F_{Th}$ could only be reached after a time interval which is longer than the interval Δt which is appropriately predefined in view of the response delay.

Figure 9:
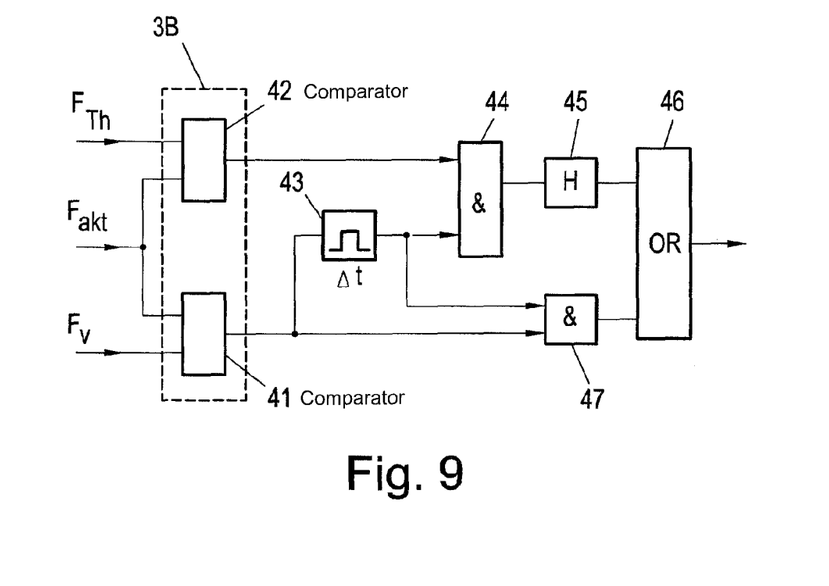
FIG. 9 is a schematic view of a block circuit diagram of an actuation process during continuous monitoring and comparison of a current force.

In particular, FIG. 8 shows, with the force profile $F_{akt1}$, the normal case which has already been explained above with reference to FIG. 2. However, in a embodiment the pre-threshold value $F_v$ can then be temporarily shifted upward as a function of the increase in the closing force $F_{akt}$, s. the dashed line $F_v'$, if the closing force $F_{akt2}$ instantaneously increases relatively gently. This in turn ensures that the time t3 when the closing force exceeds the adjusted pre-threshold value $F_v'$ is, starting from this time up to the time when the actual threshold value $F_{Th}$ is reached, a time interval which is shorter than the interval corresponding to the response delay, with the result that it is ensured that the relay 5 has not yet dropped away up to the ultimate decision about a possible trapping situation. In this embodiment, the microprocessor which is provided as computer means 3 therefore also continuously calculates the increase in the closing force in order to shift the pre-threshold value $F_v$ when a predefined gradient is undershot. If a customary anti-trapping system, such as has been described above, is used, the trapping situation is usually calculated using the computer means 3 and sequences programmed therein (that is to say by means of software). However, situations are conceivable, for example quite generally with inductive actuators etc., where a corresponding force $F_{akt}$ is monitored continuously, or generally an input parameter which is essential for the actuation is monitored. In such a case, it is possible, for example as shown in FIG. 9, for the force $F_{akt}$ to be compared, on the one hand, with a pre-threshold value $F_v$ in one comparator 41, and with the actual threshold value $F_{Th}$ in a further comparator 42. A pulse generator 43 which defines a specific time interval, specifically the time interval $\Delta t$, is connected to the output of the first comparator 41, said pulse generator 43 being, for example, a monostable multivibrator whose output is connected to an input of an AND gate 44 which receives the output signal of the second comparator 42 fed to a further input. As a result, the AND gate 44 outputs a logic output signal when, and only when, the current force $F_{akt}$ at least reaches the actual threshold value $F_{Th}$ during the time interval $\Delta t$. This output signal of the AND gate 44 can be lengthened by means of a holding circuit 45 in order to perform the ultimate actuation of the respective control element 4 by means of an OR gate 46.

For the preliminary actuation, the output signal of the first comparator 41 is also fed to an input of an AND gate 47 which receives the output signal of the pulse generator 43 fed to its other input. As a result, a signal appears at the output of the AND gate 47 when, and only when, the current force $F_{akt}$ exceeds the pre-threshold value $F_v$, and as a result a pulse—with the duration $\Delta t$—is also triggered, said pulse being present at the AND gate 47. After the pulse has ended at the output of the pulse generator 43 (that is to say at the time t2 according to FIG. 2), the pre-actuation, which was previously provided by the output signal of the AND gate 47, in turn drops away and, depending on whether or not the current force has reached the actual threshold value $F_{Th}$, the ultimate actuation or switching over of the control element 4 is brought about by means of the holding circuit 45 and the OR gate 46 starting from this time t2, or else no such ultimate switching over occurs with the result that the original actuation continues to be provided.

What is claimed is:

1. A method for actuating a control element, having a response delay, of a drive apparatus for driving an object which can be moved between two end positions, wherein the control element is operable to provide a supply voltage to said drive apparatus, the method comprising:
monitoring a parameter which is influenced by the drive apparatus and comparing the parameter with a predefined threshold value, wherein when said threshold value is reached a control signal is output to the control element for activation of the control element, wherein a pre-threshold value which is to be reached before the threshold value is reached is defined, and when said pre-threshold value is reached a pre-control signal is output to the control element for a preparatory activation thereof, wherein the pre-control signal allows for a shortened response delay of the control element, and wherein afterwards further monitoring is performed to determine whether the actual threshold value has been reached, wherein, when the actual threshold value is reached, the actuation of the control element is maintained with a reduced response delay through said pre-control signal, whereas if the actual threshold value is not reached, the activation of the control element is canceled.

2. The method according to claim 1, wherein, after the pre-threshold value has been reached, monitoring is performed to determine whether the actual threshold value has been reached for a predefined time.

3. The method according to claim 2, wherein the predefined time corresponds to a clock time predefined for the monitoring, or a multiple thereof.

4. The method according to claim 2, wherein the predefined time is between 1 ms to 2.5 ms.

5. The method according to claim 1, wherein the pre-threshold value relates to the actual threshold value.

6. The method according to claim 5, wherein the pre-threshold value is defined as being below the actual threshold value to a greater or lesser extent depending on the instantaneous change in the monitored parameter.

7. The method according to claim 1, wherein the control element comprises a switching relay, which is arranged in the circuit of an electric motor for supplying the electric motor with a supply voltage, no supply voltage or a reversed supply voltage.

8. The method according to claim 7, wherein controlling the control element is part of an anti-trapping system, wherein the monitored parameter is a variable which refers to a closing force.

9. The method according to claim 1, wherein the pre-control signal is a control signal with a level which is reduced compared to a control signal level applied before the pre-control signal is output and is fed to the control element starting from the time when the pre-threshold value is reached, wherein the control signal is switched off when the actual threshold value is reached, and in contrast the control signal level applied before the pre-control signal is output is applied again when the actual threshold value is not reached.

10. A device for actuating a control element, having a response delay, of a drive apparatus for driving an object which can be moved between two end positions, comprising:
a measuring unit for monitoring and comparing a parameter which is influenced by the drive apparatus with a predefined threshold value,
a driver stage which is operable to output a control signal to the control element for actuation of the control element when said threshold value is reached, wherein the control element is operable to provide a supply voltage to said drive apparatus,
and wherein a pre-threshold value is defined which is to be reached before the threshold value is reached, wherein the measuring unit is configured to compare the monitored parameter with the pre-threshold value, and when said pre-threshold value is reached, the driver stage is controlled to output a pre-control signal to the control element for a preparatory activation thereof, wherein the pre-control signal allows for a shortened response delay of the control element, and wherein afterwards the measuring unit is operable to determine whether the actual threshold value has been reached, wherein, when the actual threshold value is reached, the actuation of the control element is maintained by said driver stage, whereas if the actual threshold value is not reached, the actuation of the control element is canceled by said driver stage.

11. The device according to claim 10, wherein, after the pre-threshold value has been reached, to the measurement unit determines whether the actual threshold value has been reached for a predefined time.

12. The device according to claim 11, wherein the predefined time corresponds to a clock time predefined for the cyclically executed monitoring, or a multiple thereof.

13. The device according to claim 11, wherein the predefined time is between 1 ms to 2.5 ms.

14. The device according to claim 10, wherein the pre-threshold value relates to the actual threshold value.

15. The device according to claim 14, wherein the pre-threshold value is defined as being below the actual threshold value to a greater or lesser extent depending on the instantaneous change in the monitored parameter.

16. The device according to claim 10, wherein the control element comprises a switching relay, which is arranged in the circuit of an electric motor for supplying the electric motor with a supply voltage, no supply voltage or a reversed supply voltage.

17. The device according to claim 16, wherein
the driver stage is controlled by an anti-trapping system, wherein the monitored parameter is a variable which refers to a closing force.

18. The device according to claim 10, wherein the pre-control signal is a control signal with a level which is reduced compared to a control signal level applied before the pre-control signal is output and is fed to the control element starting from the time when the pre-threshold value is reached, wherein the control signal is switched off when the actual threshold value is reached, and in contrast the control signal level applied before the pre-control signal is output is applied again when the actual threshold value is not reached.

19. An anti-trapping system comprising:
a motor;
a control device operable to supply the motor with at least a supply voltage or no supply voltage, wherein the control device has a response delay,
a measuring unit for monitoring and comparing a force parameter which is influenced by the motor driven by the supply voltage provided by the control device with a predefined threshold value,
a driver stage which is operable to output a control signal to the control device for removing the supply voltage from the motor when said threshold value is reached,
wherein a pre-threshold value is defined which is to be reached before the threshold value is reached, wherein the measuring unit is configured to compare the monitored parameter with the pre-threshold value, and when said pre-threshold value is reached, the driver stage is controlled to output a pre-control signal to the control device for a preparatory activation thereof wherein the pre-control signal is chosen such that a shortened response delay of the control element is achieved, and wherein afterwards the measuring unit is operable to determine whether the actual threshold value has been reached, wherein, when the actual threshold value is reached, the control device is controlled by said driver stage to remove the supply voltage, whereas if the actual threshold value is not reached, the control device is driven by the driver stage to continue supplying the supply voltage to the motor.

20. The anti-trapping system according to claim 19, wherein for removing the supply voltage the driver stage controls the control device to supply no supply voltage to the motor or to supply non supply voltage to the motor followed by supplying a reversed supply voltage to the motor.

* * * * *